United States Patent [19]

Schmitz

[11] Patent Number: 4,550,466
[45] Date of Patent: Nov. 5, 1985

[54] CLEANING ELEMENTS FOR INSIDE CLEANING OF THE TUBES OF TUBE-TYPE HEAT EXCHANGERS AND METHOD OF MANUFACTURING SAME

[75] Inventor: Günther Schmitz, Moers, Fed. Rep. of Germany

[73] Assignee: Taprogge Gesellschaft mbH, Düsseldorf, Fed. Rep. of Germany

[21] Appl. No.: 494,665

[22] Filed: May 16, 1983

[30] Foreign Application Priority Data

May 14, 1982 [DE] Fed. Rep. of Germany ....... 3218254

[51] Int. Cl.⁴ .............................................. B08B 9/04
[52] U.S. Cl. .................. 15/104.06 R; 15/3.51
[58] Field of Search ................ 15/3.5, 3.51, 104.06 R, 15/104.06 A; 134/8; 165/95

[56] References Cited

U.S. PATENT DOCUMENTS 3,543,324  12/1970  Knapp et al. ................ 15/104.06 R

FOREIGN PATENT DOCUMENTS 1214853  11/1959  France .......................... 15/104.06 R
29580  of 1905  United Kingdom ......... 15/104.06 R Primary Examiner—Edward L. Roberts
Attorney, Agent, or Firm—Herbert L. Lerner; Laurence A. Greenberg

[57] ABSTRACT

A cleaning element for cleaning the interior of heat exchanger tubes by being carried along by a cooling water stream and automatically squeezed through the tubes by the cooling water stream, includes a sphere foamed in a closed mold, the sphere being formed of an open-cell sponge rubber core and an open-pore water-permeable skin integral with the core.

10 Claims, 3 Drawing Figures

CLEANING ELEMENTS FOR INSIDE CLEANING OF THE TUBES OF TUBE-TYPE HEAT EXCHANGERS AND METHOD OF MANUFACTURING SAME

The invention relates to cleaning elements for cleaning the inside of tubes of tube-type heat exchangers, wherein the cleaning elements, which are in the form of open-cell sponge rubber spheres, are taken along in the cooling water stream and are automatically pushed or squeezed through the tubes, as well as a method for manufacturing such cleaning elements.

It is conventional in large heat exchanger systems, such as condensers of steam power generating stations, to clean the cooling water tubes continuously or at intervals by transporting cleaning elements in the form of sponge rubber spheres through the tubes, circulating with the cooling water. The formation of deposits in the tubes is thus prevented with certainty and existing deposits are abraded by the spheres, unless they are already too hard. It is important for the operation of the sponge rubber spheres used in such a case that they be formed of open-cell sponge rubber so that they can be saturated with the surrounding cooling water and so that they can be distributed uniformly in the cooling water, so that all tubes are reached.

To achieve this water absorptivity, it has been customary heretofore to mill these spheres out of corresponding sponge rubber mats or to foam such sponge rubber spheres in spherical molds. However, these foamed spheres then usually have a closed skin which is water-impermeable, or almost water-impermeable. The skin therefore had to be removed by grinding or milling in order to make the spheres capable of absorbing water. Thus, the spheres which are milled out of mats as well as the spheres which are foamed in molds and have their skin removed later, are formed of uniform material throughout, which is fully capable of absorbing water.

Overall, these sponge rubber spheres have found acceptance in cleaning the tubes of heat exchangers; it is only in some cases, in tubes with excessive roughness on the inside wall, that too much abrasion resulted, so that the spheres must be replaced very quickly because otherwise their diameter will become too small for cleaning.

The open-cell sponge rubber for such spheres is generally made of conventional mixtures of natural or synthetic rubber with the customary additions of accelerators, antiaging agents, softeners and fillers, which are filled into molds, foamed in the molds and fully vulcanized at elevated temperature and pressure. Such mixtures are known, for instance, from the book "Einfuehrung in die Rezeptentwicklung der Gummiindustrie" (Introduction to the Formula Development of the Rubber Industry) by Werner Kleemann, Dipl.-Chem., VEB Deutscher Verlag für Kunststoffindustrie, Leipzig 1966, particularly pages 493 to 501, as well as from Information Sheet No. 69 of NRPRA (The National Rubber Bureau (Malayan Rubber Fund Board)), Escherscheimer Landstr. 275, 6000 Frankfurt/Main, Germany. The mixtures described therein generally have a content of stearic acid in the amount of 2 to 12% by weight as a softener and result in the above-described sponge rubber spheres.

It is accordingly an object of the invention to provide a cleaning element for cleaning the inside of heat exchanger tubes and a method of manufacturing the same, which overcomes the hereinaforementioned disadvantages of the heretofore-known devices and methods of this general type, and in contrast thereto, to provide cleaning elements or sponge rubber spheres which have higher abrasion resistance and at the same time a large capacity to absorb water.

With the foregoing and other objects in view there is provided, in accordance with the invention, a cleaning element for cleaning the interior of heat exchanger tubes by being carried along or entrained by a cooling water stream and automatically squeezed through the tubes by the cooling water stream, comprising a sphere foamed in a closed mold, the sphere being formed of an open-cell sponge rubber core and an open-pore water-permeable skin integral with the core.

Through the use of such an integral skin, very high abrasion resistance and therefore good cleaning efficiency of the sponge rubber spheres are obtained, while on the other hand the sponge rubber spheres with their open cells in the interior can absorb water very easily because the skin has open pores.

In accordance with another feature of the invention, the skin has a smooth surface.

In accordance with a further feature of the invention, the sphere has a structured surface with different levels.

In accordance with an added feature of the invention, the sphere has a structured surface with depressions formed therein and/or raised portions formed thereon.

In accordance with an additional feature of the invention, the sphere has a structured surface with knubs or lamellar webs formed thereon.

In accordance with again another feature of the invention, the webs are in the form of hexagonal honeycombs or honeycombed cells.

In accordance with again a further feature of the invention, the surface has open pores, at least between the raised portions.

In order to manufacture the cleaning element, there is provided a method which comprises placing a rubber mixture in a closed spherical mold, selecting a softener component in the form of stearic acid in an amount between 15 and 25% by weight relative to the weight of the rubber mixture, adding a foaming agent or propellant and the softener component to the rubber mixture in the mold, and foaming a sponge rubber sphere with an open-cell core and an open-pore water-permeable skin integral with the core in the mold.

A stearic acid content in such a high amount in the case of sponge rubber spheres foamed in a mold results in an open-pore skin in spheres which have high abrasion resistance as well as high water absorptivity.

In accordance with another mode of the invention, there is provided a method which comprises selecting the softener component between 18 and 23% by weight relative to the weight of the rubber mixture.

In accordance with a further mode of the invention, there is provided a method which comprises providing the sphere with a smooth surface.

In accordance with an added mode of the invention, there is provided a method which comprises shaping the foaming mold for providing the sphere with a structured surface.

In accordance with an additional mode of the invention, there is provided a method which comprises forming substantially cylindrical depressions in the surface of the spherical mold for providing knubs on the surface of the sphere.

In accordance with a concomitant mode of the invention, there is provided a method which comprises forming lamellar or honeycombed depressions in the inner surface of the spherical mold for providing protruding webs on the surface of the sphere.

Other features which are considered as characteristic for the invention are set forth in the appended claims.

Although the invention is illustrated and described herein as embodied in cleaning elements for inside cleaning of the tubes of tube-type heat exchangers and method of manufacturing same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings, in which.

Figure 1:
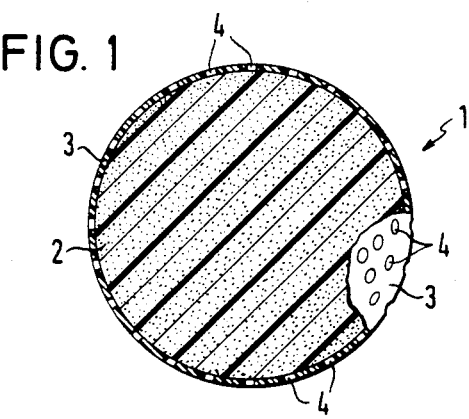
FIG. 1 is a cross-sectional view, partly broken away, of a sponge rubber sphere with a smooth surface.

Referring now to the figures of the drawing in detail and first particularly to FIG. 1 thereof, there is seen a sponge rubber sphere 1 which is mostly shown in cross section and has a smooth surface skin 3 and an open-cell core 2. The core 2 is condensed toward the surface into the skin 3 which is integral with the core, and the core has numerous open pores 4 formed therein. For better visibility, the skin 3 and the pores 4 are greatly simplified diagrammatically, in order to better explain the operation of the device; actually, the skin becomes gradually denser to form a dense surface and the pores 4 are very much smaller than shown. By providing these open pores in the integral skin 3, the sponge rubber sphere 1 which has open cells in the interior, can also be fully irrigated, or fully saturated with water. On the other hand, the dense skin 3 assures better abrasion resistance and accordingly longer service life of the sphere.

Figure 2:
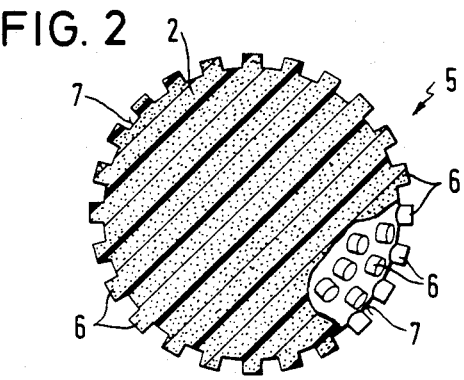
FIG. 2 is a view similar to FIG. 1 of a sponge rubber sphere with a knub-like surface.

In order to further increase its cleaning effect, the sponge rubber sphere 5 of FIG. 2 is provided on its surface with knubs 6 in the form of bosses or projections which may have cylindrical or even prismatic shape. These knubs 6 may be formed onto the sphere by working corresponding approximately cylindrical depressions in the inner surface of a spherical foaming mold. The depressions are filled with a raw mixture, or sponge rubber material likewise penetrates into the depressions if the mixture is foamed up.

Because of the small volume of the individual knubs 6, the material forming the knubs generally has only a slight cell structure, but a closed external skin. However, it is important for surface sections 7 of the sphere surface proper to have open pores between the individual knubs 6, so that the sponge rubber sphere 5 can thus absorb water. The higher density of the knubs 6, in which the material is not fully foamed, is also a major advantage for the overall cleaning action of the sponge rubber sphere, since a better cleaning effect is therefore also obtained.

Figure 3:
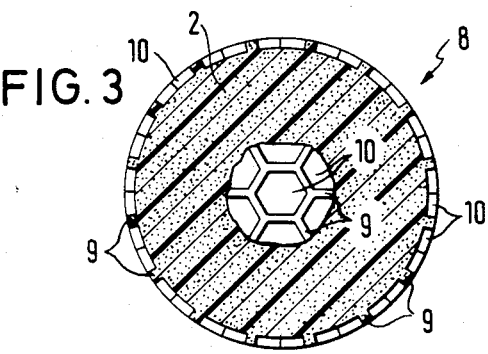
FIG. 3 is a cross-sectional top view, partly broken away, of a sponge rubber sphere with honeycomb-like laminations on the surface.

A further embodiment of a sponge rubber sphere with a structured surface is shown in FIG. 3. In the FIG. 3 embodiment, the sponge rubber sphere 8 has webs 9 at its surface in the form of laminations or segments which may have the shape of hexagonal honeycombs. For manufacturing the webs 9, an approximately honeycombed pattern is similarly cut in this case into the inner surface of a spherical foaming mold, so that the individual cuts are then filled with the raw material for the sponge rubber.

In the FIG. 3 embodiment as well, the webs 9 have a denser consistency, while spherical surface sections 10 between the individual webs are open-pored. In this way, the open-cell core 2 can be easily saturated with water when the sponge rubber spheres are used.

Only two embodiments were explained above for structuring the surface of the sponge rubber spheres. However, the invention is not limited to these embodiments. On the contrary, other forms of structuring are also possible, in order to ensure better cleaning performance, while providing a structure in which porous regions still remain between the individual structural elements of the spherical surface proper, through which the cellular core can absorb water.

EXAMPLE

The good water absorption of the sponge rubber sphere according to the invention will be demonstrated by the following comparative experiments. The sponge rubber spheres were compressed under water so many times that they would sink in the water by themselves, i.e., practically all of the air in the sphere was replaced by water. The number of irrigating or moistening strokes necessary for this to occur is a measure of the water absorptivity or the degree of openness of the skin provided by the pores.

The following sponge rubber spheres were tested:

(a) Conventional sphere with milled-off skin leaving no abrasive surface; (b) conventional sphere in the raw condition with foamed-on skin; and (c) a sphere according to the invention in the raw condition after removal from the foaming mold.

The following test conditions applied:

| The following test conditions applied: | |
| --- | --- |
| Sphere diameter: | 25 mm |
| Deformation force: | 70 N (final value) |
| Deformation rate: | 0.11 m/s |
| Test Results: | |
| (a) milled sphere: | 6 strokes |
| (b) unworked sphere: | more than 30 strokes (no sinking even after 30 strokes) |
| (c) sphere according to invention: | 7 strokes. |

It has thus been demonstrated that the spheres according to the invention with the integral, open-pore skin have practically the same water absorption capacity as those conventionally used having a ground or milled surface, but of course they have considerably higher abrasion resistance.

The foregoing is a description corresponding in substance to German application No. P 32 18 254.6-16, dated May 14, 1982, the International priority of which is being claimed for the instant application, and which is hereby made part of this application. Any material discrepancies between the foregoing specification and the aforementioned corresponding German application are to be resolved in favor of the latter.

I claim:

1. Cleaning element for cleaning the interior of heat exchanger tubes by being carried along by a cooling water stream and automatically squeezed through the tubes by the cooling water stream, comprising a sphere with a center foamed in a closed mold, said sphere being formed of an open-cell sponge rubber core being condensed toward the surface of said sphere into a gradually denser open-pore water-permeable skin integral with said core.

2. Cleaning element according to claim 1, wherein said skin has a smooth surface.

3. Cleaning element according to claim 1, wherein said sphere has a structured surface with different levels.

4. Cleaning element according to claim 1, wherein said sphere has a structured surface with depressions formed therein.

5. Cleaning element according to claim 1, wherein said sphere has a structured surface with raised portions formed thereon.

6. Cleaning element according to claim 5, wherein said surface has open pores, at least between said raised portions.

7. Cleaning element according to claim 1, wherein said sphere has a structured surface with depressions formed therein and raised portions formed thereon.

8. Cleaning element according to claim 1, wherein said sphere has a structured surface with knubs formed thereon.

9. Cleaning element according to claim 1, wherein said sphere has a structured surface with lamellar webs formed thereon.

10. Cleaning element according to claim 9, wherein said webs are in the form of hexagonal honeycombs.

* * * * *